US006799175B2

(12) United States Patent  
Aggarwal (10) Patent No.: US 6,799,175 B2
(45) Date of Patent: Sep. 28, 2004

(54) SYSTEM AND METHOD OF DETERMINING AND SEARCHING FOR PATTERNS IN A LARGE DATABASE

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 09/840,652

(22) Filed: Apr. 23, 2001

(65) Prior Publication Data

US 2002/0169772 A1 Nov. 14, 2002

(51) Int. Cl.$^7$ ............................................. G06F 17/30
(52) U.S. Cl. .................... 707/5; 707/4; 707/6
(58) Field of Search .............................. 707/6, 5, 1, 2, 707/3, 4; 345/712, 440

(56) References Cited

U.S. PATENT DOCUMENTS

| | | | | | |
|---|---|---|---|---|---|
| 5,832,182 | A | * | 11/1998 | Zhang et al. | 706/50 |
| 5,912,674 | A | * | 6/1999 | Magarshak | 345/440 |
| 5,974,412 | A | * | 10/1999 | Hazlehurst et al. | 707/3 |
| 6,115,708 | A | * | 9/2000 | Fayyad et al. | 707/6 |
| 6,121,969 | A | * | 9/2000 | Jain et al. | 345/850 |
| 6,154,213 | A | * | 11/2000 | Rennison et al. | 345/854 |
| 6,226,409 | B1 | * | 5/2001 | Cham et al. | 382/228 |
| 6,523,026 | B1 | * | 2/2003 | Gillis | 707/3 |
| 6,564,202 | B1 | * | 5/2003 | Schuetze et al. | 707/2 |
| 6,567,797 | B1 | * | 5/2003 | Schuetze et al. | 707/2 |
| 2001/0049689 | A1 | * | 12/2001 | Mentzer | 707/104.1 |

OTHER PUBLICATIONS

Sheikholeslami et al. "WaveCluster: A Wavelet–Based Clustering Approach for Spatial Data in Very Large Databases" The VLDB Journal—The International Journal on Very Large Databases. vol. 8, Issue 3–4. pp. 289–304. Feb. 2000. Springer–Verlag New York.*

K. Beyer et al., "When is Nearest Neighbor Meaningful?," Proceedings of the ICDT Conference, 19 pages, 1999.
M. Livny et al., "Fast Density Estimation Using CF–Kernel for Very Large Databases," Proceedings of the ACM SIGKDD Conference, pp. 1–22, 1996.
V. Gaede et al., "Multidimensional Access Methods," ACM Computing Surveys, vol. 30, No. 2, pp. 1–86, 1998.
R. Weber et al., "A Quantitative Analysis and Performance Study for Similarity–Search Methods in High–Dimensional Spaces," Proceedings of the 24th VLDB Conference, New York, USA, 12 pages, 1998.
N. Katayama et al., "The SR–Tree: An Index Structure for High Dimensional Nearest Neighbor Queries," Proceedings of the 1997 ACM SIGMOD International Conference on Management of Data, 13–15, Tucson, Arizona, pp. 1–12, May 1997.
S. Berchtold et al., "The X–Tree: An Index Structure for High–Dimensional Data," Proceedings of the 22nd International Conference on Very Large Databases (VLDB'96), Bombay, India, 12 pages, 1996.
K.–I. Lin et al., "The TV–tree: An Index Structure for High Dimensional Data," VLDB Journal, vol. 3, No. 4, pp. 1–30, 1992.

* cited by examiner

Primary Examiner—Safet Metjahic
Assistant Examiner—Brian Goddard
(74) Attorney, Agent, or Firm—Rafael Perez-Pineiro; Ryan, Mason & Lewis, LLP (57) ABSTRACT

Techniques are provided for finding query responses from database queries using an interactive process between a user (e.g., a person entering a query to a database) and a computer system (e.g., a computing system upon which the database resides or which has access to the database). The interactive process comprises providing the user with one or more visual perspectives as feedback on the distribution of points in the database. These visual perspectives may be considered by the user in order for the user to provide feedback to the computer system. The computer system may then use the user-provided feedback to determine the best response to the query.

46 Claims, 9 Drawing Sheets

SYSTEM AND METHOD OF DETERMINING AND SEARCHING FOR PATTERNS IN A LARGE DATABASE

FIELD OF THE INVENTION

The present invention generally relates to techniques for querying large databases and, more particularly, to query techniques which employ a user/computer interactive process including visual feedback in order to find the best responses to a given query.

BACKGROUND OF THE INVENTION

In recent years, large databases have become very common because of the ability to store large amounts of information with the current advances in hardware technology. Such databases are often queried by users in order to find specific patterns of behavior. Finding the closest matching object is important for a number of applications. Examples include similarity searches in geometric databases, multimedia databases, and data mining applications such as fraud detection, information retrieval, among numerous other domains. Many of these domains contain applications in which the dimensionality of the representation is very high. For example, a typical feature extraction operation on an image will result in hundreds of dimensions. By way of another example, a data set which is inherently dimensionally high may be a demographic database in which the dimensions comprise information such as the name, age, salary, and other features which characterize a person.

Similarity retrieval problems are reasonably well solved for low dimensional applications for which efficient index structures have been proposed. A wide variety of multidimensional indexes have been proposed which work well for low dimensional data. For a comprehensive overview, see, e.g., V. Gaede et al., "Multidimensional Access Methods," ACM Computing Surveys, vol. 30, no. 2, pp. 170–231, 1998, the disclosure of which is incorporated by reference herein. These structures can support a wide range of queries such as point queries, range queries, or similarity queries to a predefined target.

However, many empirical studies have shown that traditional indexing methods fail in high dimensional spaces, see, e.g., K. Beyer et al., "When is Nearest Neighbors Meaningful?," Proceedings of the ICDT Conference, 1999; K. -I. Lin et al., "The TV-tree: An Index Structure for High Dimensional Data," VLDB Journal, vol. 3, no. 4, pp. 517–542, 1992; N. Katayama et al., "The SR-Tree: An Index Structure for High Dimensional Nearest Neighbor Queries," Proceedings of the ACM SIGMOD International Conference on Management of Data, pp. 369–380, 1997; R. Weber et al., "A Quantitative Analysis and Performance Study for Similarity-Search Methods in High-Dimensional Spaces," VLDB, pp. 194–205, 1998; and S. Berchtold et al., "The X-Tree: An Index Structure for High-Dimensional Data," Proceedings of the International Conference on Very Large Databases (VLDB'96), Bombay, India, pp. 28–39, 1996, the disclosures of which are incorporated by reference herein. In such cases, almost the entire index is accessed by a single query. In fact, the use of most indexes may be less efficient and/or effective than a sequential scan because of the simplicity of the latter. Furthermore, as recent results in the above-referenced K. Beyer et al. article show, it may often be difficult to determine the meaningfulness of the nearest neighbor for a query point. In fact, in many cases, it has been shown that the distance measurements to the target are not very meaningful with the use of traditional distance functions.

SUMMARY OF THE INVENTION

The present invention provides techniques for finding query responses from database queries using an interactive process between a user (e.g., a person entering a query to a database) and a computer system (e.g., a computing system upon which the database resides or which has access to the database). The interactive process comprises providing the user with one or more visual perspectives as feedback on the distribution of points in the database. These visual perspectives may be considered by the user in order for the user to provide feedback to the computer system. The computer system may then use the user-provided feedback to determine the best response to the query.

In one illustrative aspect of the invention, a method for resolving queries in large databases is provided which uses an interactive process. More specifically, in response to a user query to a database, the method comprises providing a user with different views of the data which the user can use in order to vote on the effectiveness of different sets of points which match the query the user entered. These responses may then be aggregated to determine the true sets of responses corresponding to the original user intent.

The conventional fully-automated systems discussed above are incomplete in their characterization of the data in terms of a single best distance function. However, the present invention realizes that different projections can provide different views of the data, all of which may be quite informative to a human in understanding the relationship between a query point and the rest of the data in a database. Furthermore, the present invention realizes that it is often easier for a human to make judgments on the viability of clusters of different shapes and sizes in a given view, or whether a view yields any useful information at all. That is, a computer cannot match the visual insight and intuition of a human in distinguishing useful patterns from the data. On the other hand, a human needs computational support in analyzing large volumes of high dimensional data in order to find the relevant characteristics of the data which relate the "query point" to the database. It is to be appreciated that, in one example, the query point may refer to a data record specified by a user that is used to locate patterns in a database that are closely related to the data record.

Accordingly, in accordance with an illustrative embodiment of the present invention, a computer provides an iterative visual feedback loop in which carefully chosen views of the data are presented to a user to illustrate the different clusters in the data. Once these views have been determined, then kernel density estimation may be used to provide a visual profile of the distribution of the data. These visual profiles are used to determine the clusters.

It is evident to those skilled in the art that the above method may be used in order to determine either the closest patterns to a given query point or the different clusters in the data. This can be done by finding the patterns close to multiple query points which are chosen randomly. These different patterns form the clusters in the data.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In order to describe illustrative techniques of the present invention, some technical background and definitions are now provided. An illustrative approach employed by the present invention is based on the use of kernel density estimation. As is known, kernel density estimation is a technique for creating visual profiles of data. Kernel density estimation is described in T. Zhang et al., "Fast Density Estimation Using CF-Kernel for Very Large Databases," Proceedings of the ACM SIGKDD Conference, 1999, the disclosure of which is incorporated by reference herein.

The idea in kernel density estimation is to provide a continuous estimate of the density of some data at a given point. There are two kinds of methods of kernel density estimation: (i) parametric; and (ii) non-parametric. In parametric methods, it is assumed that the kernel function $f(x)$ belongs to some parametric family of distributions. The parameters of this distribution are estimated using the data set at hand. In non-parametric methods, nothing is assumed about the nature of the data distribution. Rather, the value of the density at a given point is estimated as the sum of the smoothed values of kernel functions $K'_h(.)$ associated with each point in the data set. Each kernel function is associated with a kernel width h which determines the level of smoothing created by the function. The kernel estimation based on n data points and kernel function $K'_h(.)$ is defined as follows:

$$f(x) = \frac{1}{n} \cdot \sum_{i=1}^{n} K'_h(x - X_i)$$

Thus, each discrete point $X_i$ in the data set is replaced by a continuous function $K'_h$ and has a variance which is determined by the smoothing parameter h. An example of such a distribution is a gaussian kernel with width h.

Further, $$K'_h(x - X_i) = \frac{1}{h\sqrt{2\pi}} \cdot e^{-\left(\frac{x - X_i}{h}\right)^2}.$$

Here, e is the exponential constant with a value of approximately 2.718 and π is the mathematical constant with a value of approximately 3.14159. The overall effect of kernel density estimation is to convert a discrete data set into a continuous density estimate by replacing each data point in the data set with a smoothed bump, whose width is determined by h. The density distribution at a given coordinate is equal to the sum of the contributions of all the bumps represented by the data points. The result is a continuous distribution in which the random artifacts are suppressed and the density behavior provides a global overview of the densely, as well as sparsely, populated regions of the data. The estimation error depends upon the kernel width h which is chosen in a data-driven manner. For the d-dimensional case, the kernel function is chosen to be the product of d identical kernels $K'_h(.)$, each with its own smoothing parameter h(i). An example of a density estimate for a discrete set of data points will be described later.

Figure 1:
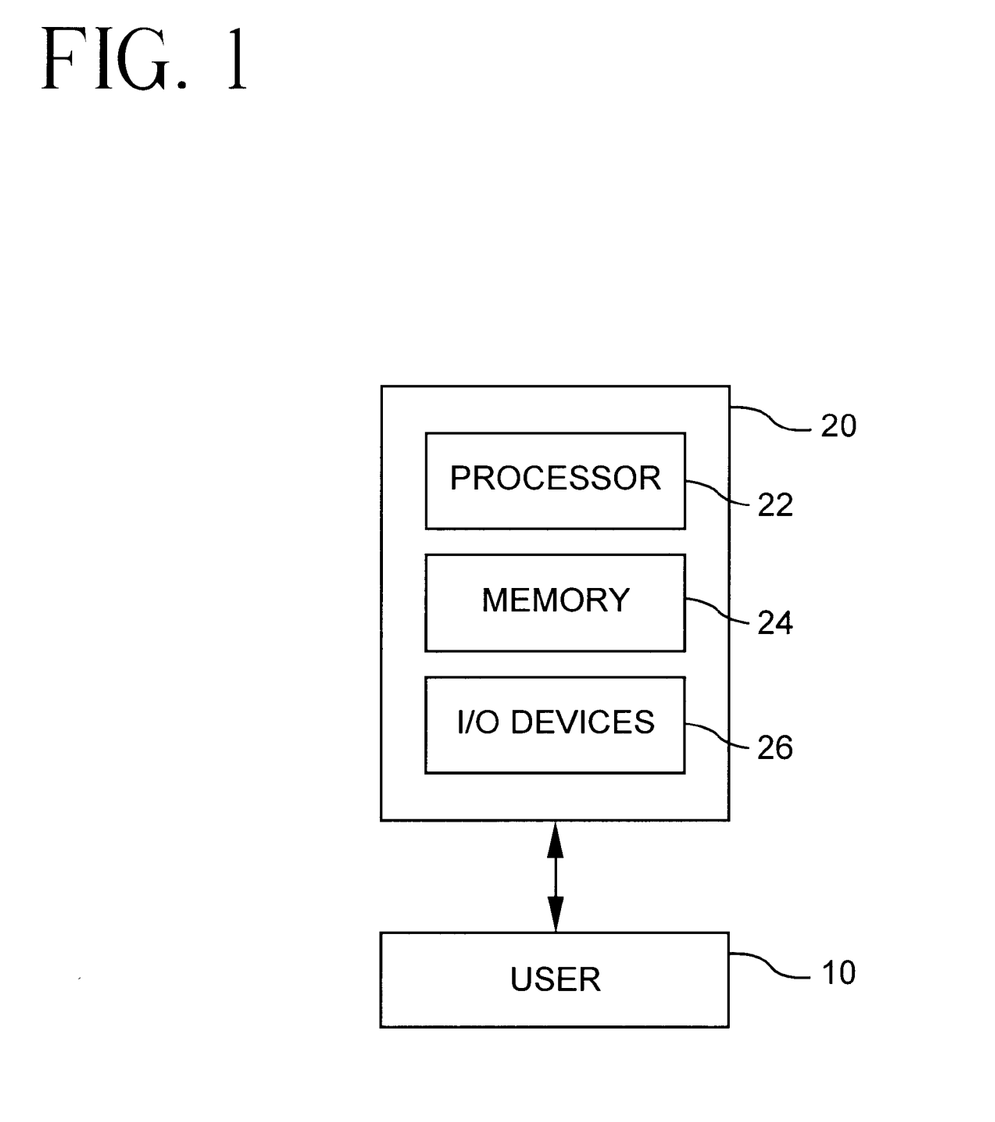
FIG. 1 is a block diagram illustrating a hardware implementation suitable for employing interactive query response methodologies according to an embodiment of the present invention.

Referring initially to FIG. 1, a block diagram illustrates a hardware implementation suitable for employing interactive query response methodologies according to an embodiment of the present invention. It is assumed that a user 10 and a computer system 20 interact in order to resolve queries effectively. The computer system 20, as shown, may comprise a processor 22, memory 24 and I/O devices 26.

It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard disk drive), a removable memory device (e.g., diskette), other disk storage devices, flash memory, etc. In addition, the term "input/output devices" or "I/O devices" as used herein is intended to include, for example, one or more input devices (e.g., keyboard, mouse, etc.) for inputting data to the processing unit, and/or one or more output devices (e.g., CRT display, printer, etc.) for presenting results associated with the processing unit. It is also to be understood that "processor" may refer to more than one processing device and that various elements associated with a processing device may be shared by other processing devices.

Accordingly, software components (e.g., one or more programs) including instructions or code for performing the interactive query response methodologies of the invention, as described herein, may be stored in one or more of the associated memory devices (e.g., ROM, fixed or removable memory) as an article of manufacture and, when ready to be utilized, loaded in part or in whole (e.g., into RAM) and executed by the processor.

More specifically, a query is entered by the user 10 into the computer system 20. The query comprises a target object. The user query may be entered using one or more of the I/O devices 26 (e.g., keyboard, mouse). The computer then uses data in the subject database stored in memory 24 (e.g., a data storage device) to perform an interactive process of presenting the user with the relationship between the stored data and the target object associated with the query. The presentation in the form of visual feedback from the computer system to the user may be made on one of more of the I/O devices 26 (e.g., a display screen) of the computer system. The processor 22 performs the necessary computations and other operations. The user enters feedback based on the data presented by the computer which is then stored in memory. The user feedback may be provided using one or more of the I/O devices 26 (e.g., keyboard, mouse). The user feedback is then used by the computer to determine the best response for the entered query.

It is to be understood that while FIG. 1 illustrates a single computer system being interacted with by the user, the invention is not so limited. That is, the database that is being queried may reside on one or more computer systems other than the computer system which receives the user's query. Also, query processing may be performed on more than one computer system.

Furthermore, the user may enter his query at one computer, e.g., client, which is remotely coupled to another computer, e.g., server, which performs all or a portion of the operations associated with the methodologies of the invention. Again, the database may be resident on the server or accessible by the server. The user then views results generated by the server on his client computer. The computers may be coupled via a network, e.g., Internet, private network, a local area network, or some other suitable network.

Figure 2:
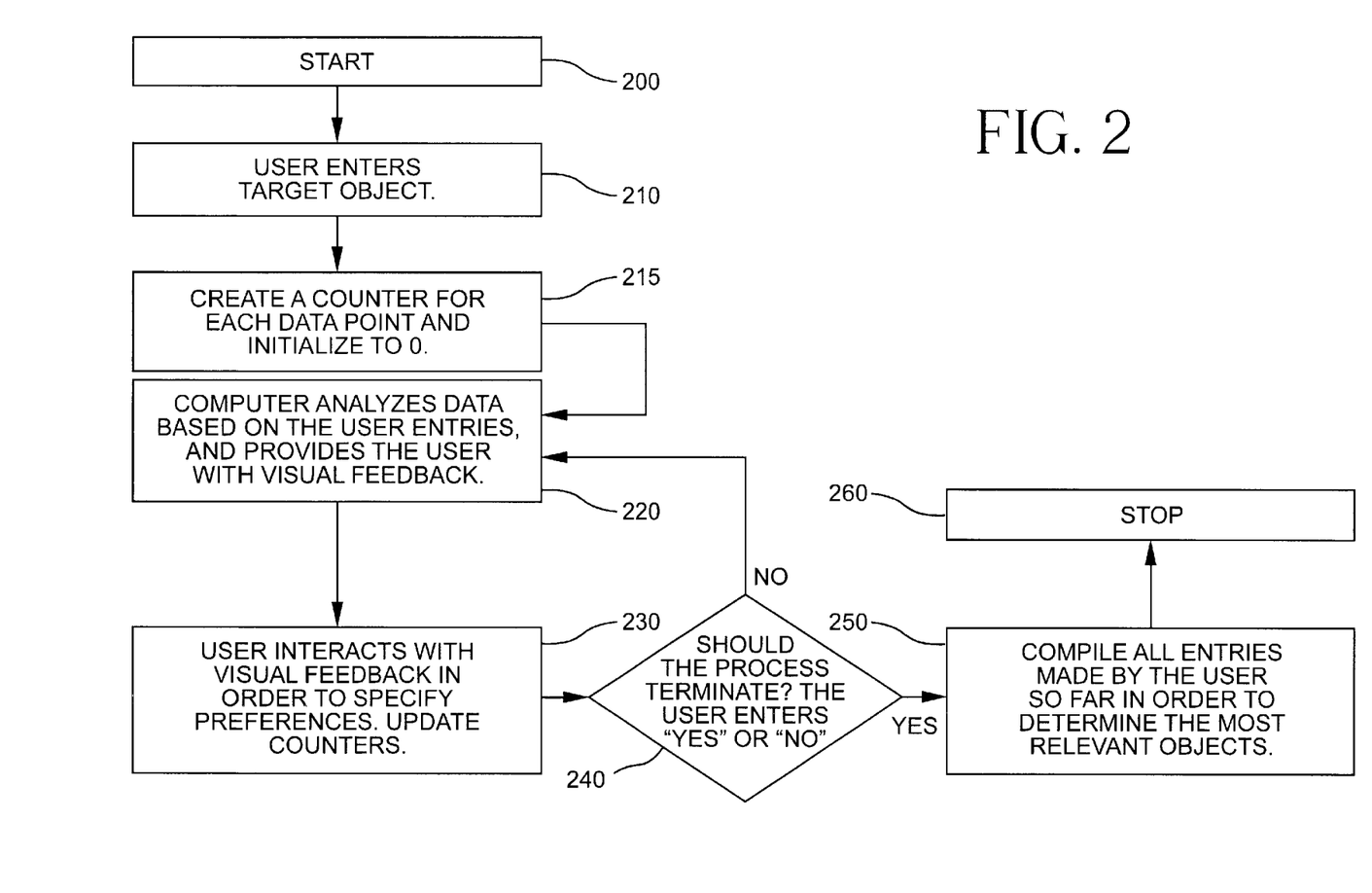
FIG. 2 is a flow diagram illustrating an overall interactive query response methodology according to an embodiment of the present invention.

A detailed description of the interaction between the user 10 and the computer 20 will now be provided in the context of FIG. 2. Specifically, FIG. 2 is a flow diagram illustrating an overall interactive query response methodology according to an embodiment of the present invention. As shown, the overall method begins at block 200. In step 210, the user enters the target object, i.e., query, into the computer. In step 215, a counter is created for each data point in the database and is initialized to zero. The counters are successively updated corresponding to the user interaction in step 230.

In steps 220 through 240, the target object is used in conjunction with an interactive process to find the object in the database that is of most interest to the user. In step 220, the data obtained from the original query by the computer is analyzed and used to provide the user with a visual overview of the key aspects of the data, i.e., visual feedback. A detailed description of this process is provided below in the context of FIG. 3. In step 230, the user interacts with the visual feedback and enters preferences into the computer. These preferences comprise the user's votes as to the data points which are the best matches to the target. A detailed description of this process is provided below in the context of FIG. 4. The counters are also updated in step 230. In step 240, the computer asks the user for feedback on whether the process should terminate. It is to be appreciated that the user has the flexibility to make a decision based on any criteria he sees fit. For example, if one particular data point has many votes, he may choose to terminate. Accordingly, the user answers "yes" or "no." If the user answers "no," then the system returns to step 220. Typically, the response to step 240 is based on whether a sufficient number of 2-dimensional projections have been explored. If the user answers "yes" in step 240, then in step 250, all the entries made by the user are compiled together in order to determine the best search results. This process is described in detail below in the context of FIG. 5. The overall process ends at block 260.

It is evident to those skilled in the art that the inventive technique can be used for finding not just related patterns to a given query point, but also interesting patterns and clusters in the data. This can be achieved by picking multiple query points by randomly sampling the data and applying the process of FIG. 2. By this process, the clusters containing different data points will be effectively discovered.

Figure 3:
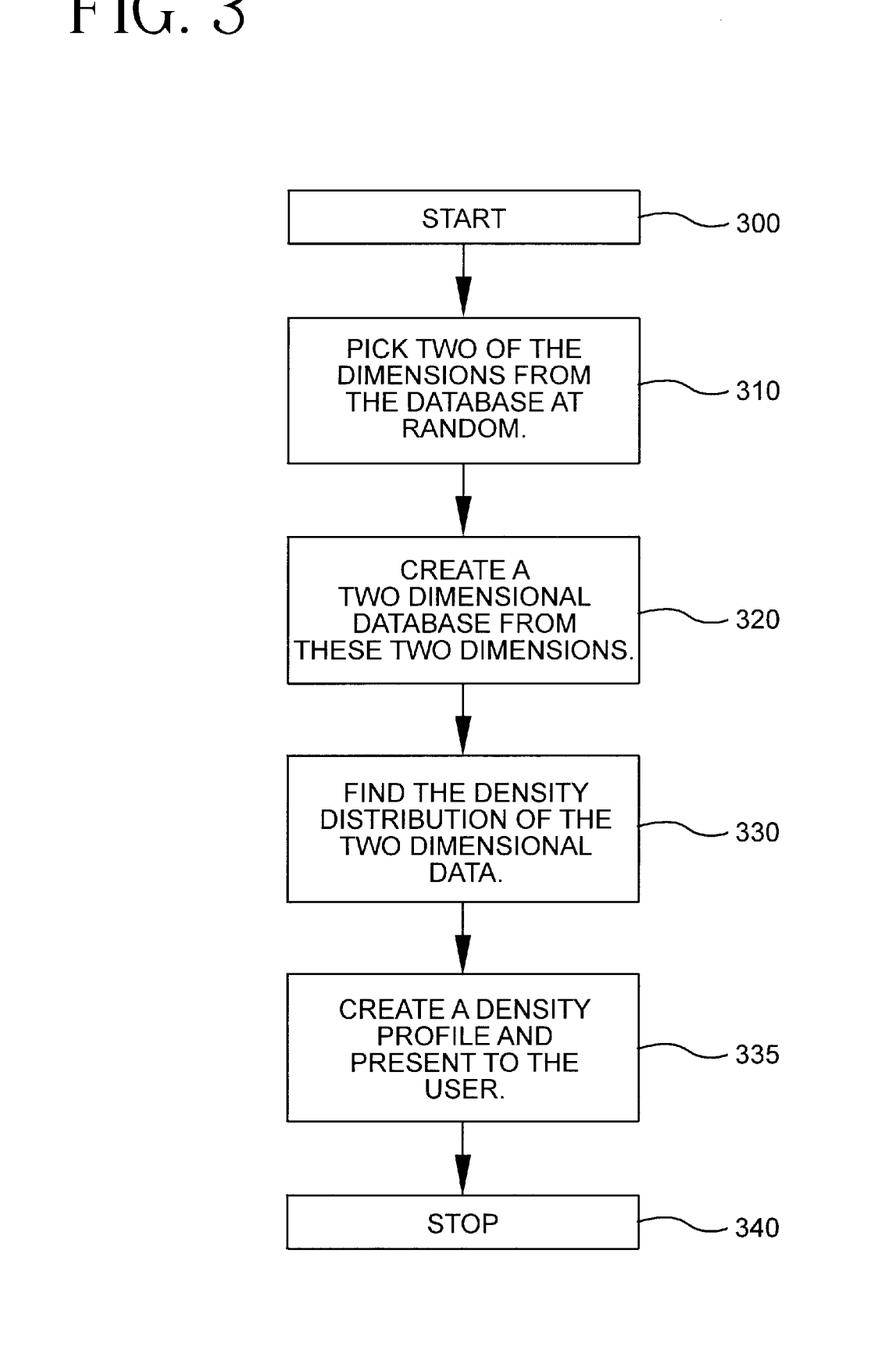
FIG. 3 is a flow diagram illustrating a process for providing a user with feedback according to an embodiment of the present invention.

Referring now to FIG. 3, a flow diagram illustrates a process for providing a user with feedback according to an embodiment of the present invention. It is to be understood that this process corresponds to step 220 in FIG. 2. More specifically, FIG. 3 illustrates a process used by the computer to generate a profile in response to the original query. In step 310, the computer picks two of the dimensions from the database at random. In step 320, a 2-dimensional database is created from the original database by using only the data in these two dimensions.

Figure 7A:
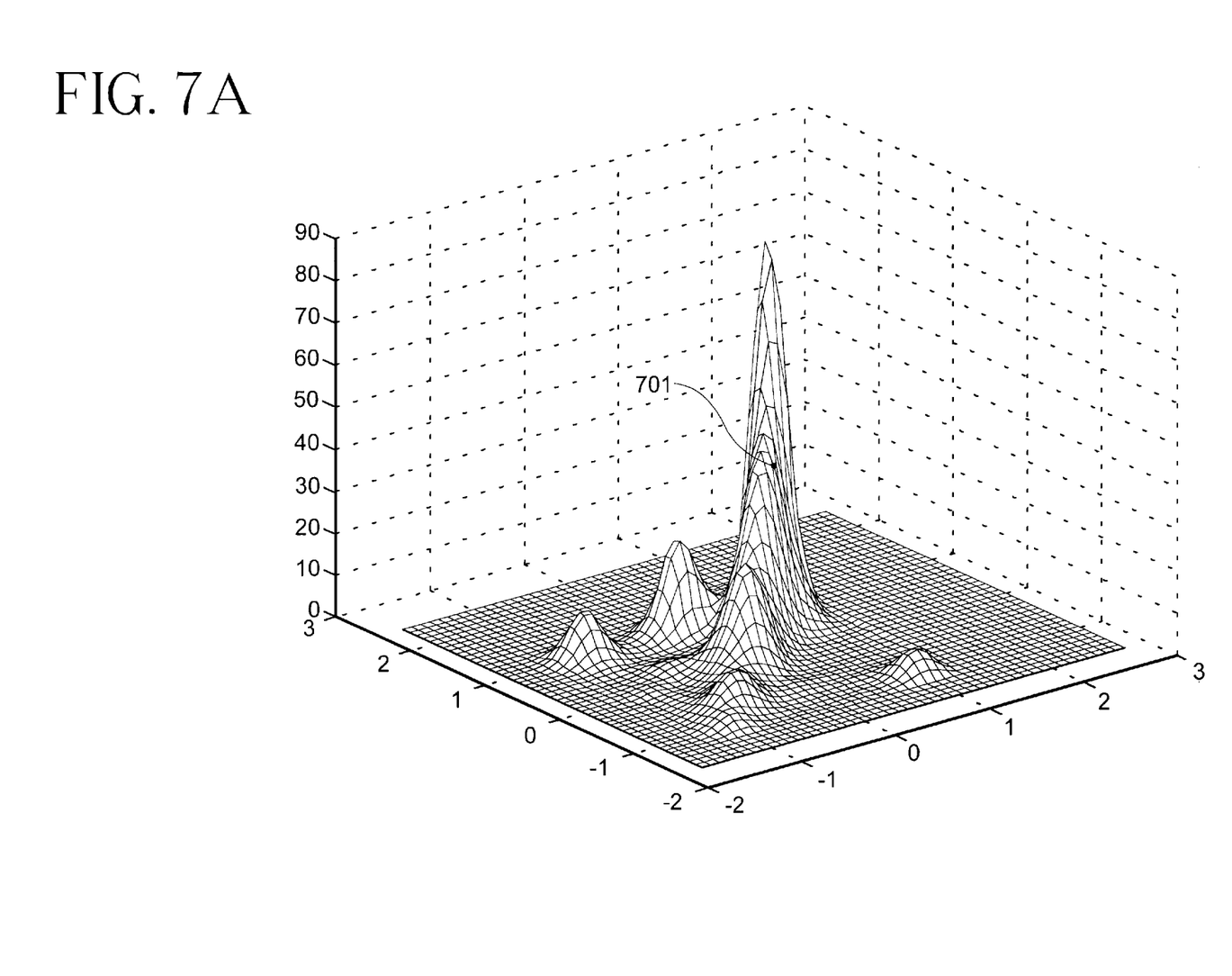
FIG. 7A is diagram illustrating an example of a density estimate of a set of data points according to an embodiment of the present invention.
Figure 7B:
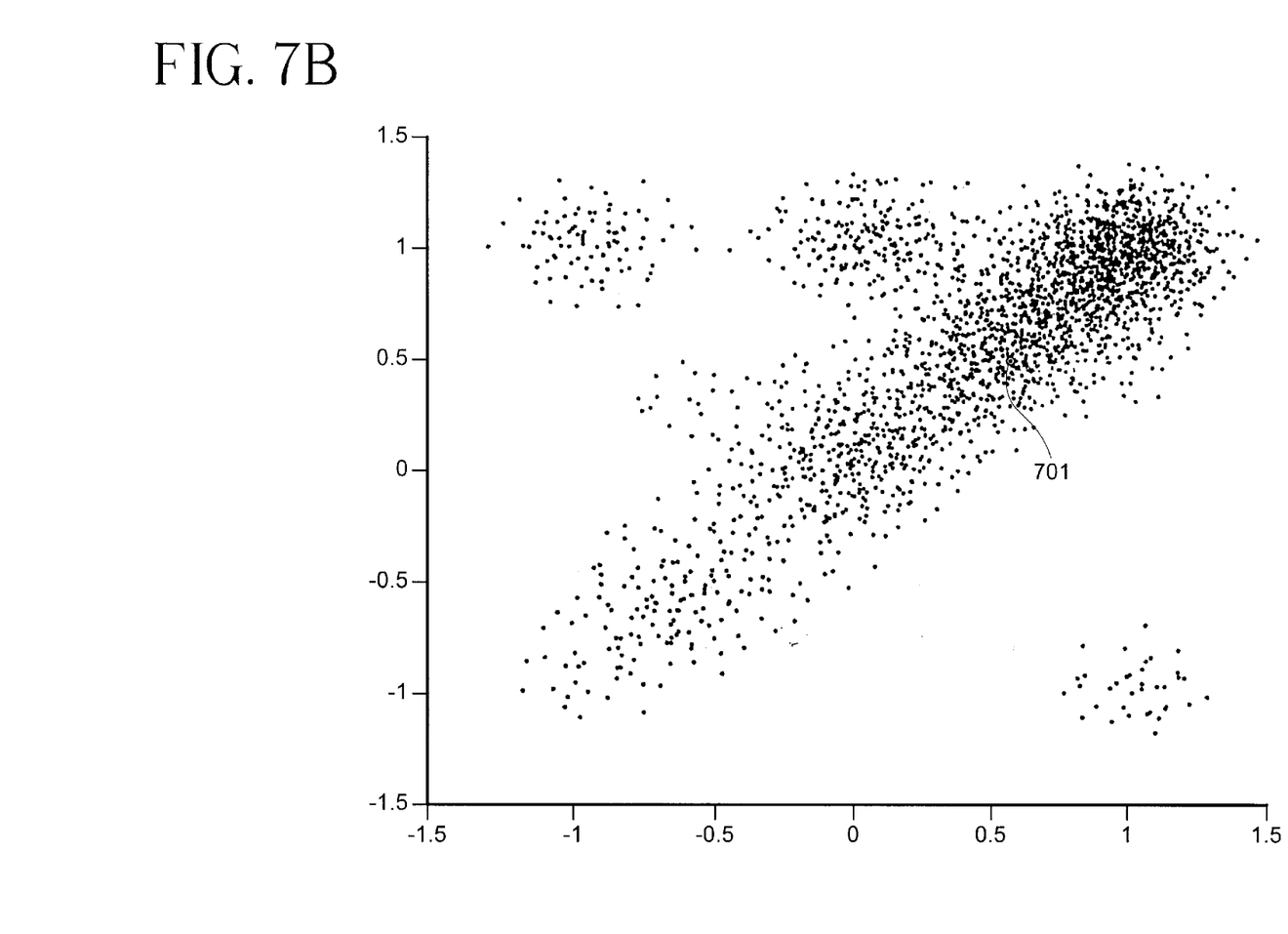
FIG. 7B is diagram illustrating a set of data points from which the density estimate of FIG. 7A has been constructed according to an embodiment of the present invention.

In step 330, density distributions of the data associated with the 2-dimensional database are created using the process of kernel density estimation which is generally explained above and otherwise well-known in the art. Assume that for each 2-dimensional point $(a, b)$ in the database, the value of the density is equal to $f(a, b)$. Then, the computer creates a 3-dimensional plot which illustrates the density of the data along with the different values of $a$ and $b$. An example of such a density plot is illustrated in FIG. 7A. The query point 701 is illustrated in the same plot. Note that the peaks in this plot correspond to the densely populated regions, whereas the valleys in the plot correspond to the sparsely populated regions. This visual representation is provided to the user in step 335. FIG. 7B illustrates the set of data points which correspond to the plot in FIG. 7A. Note that the process of step 310 need not be implemented in a manner such that the dimensions from the database are chosen only at random. For example, the distribution of the data around the query point may be used to determine the nearest neighbors. The process ends at block 340.

Figure 4:
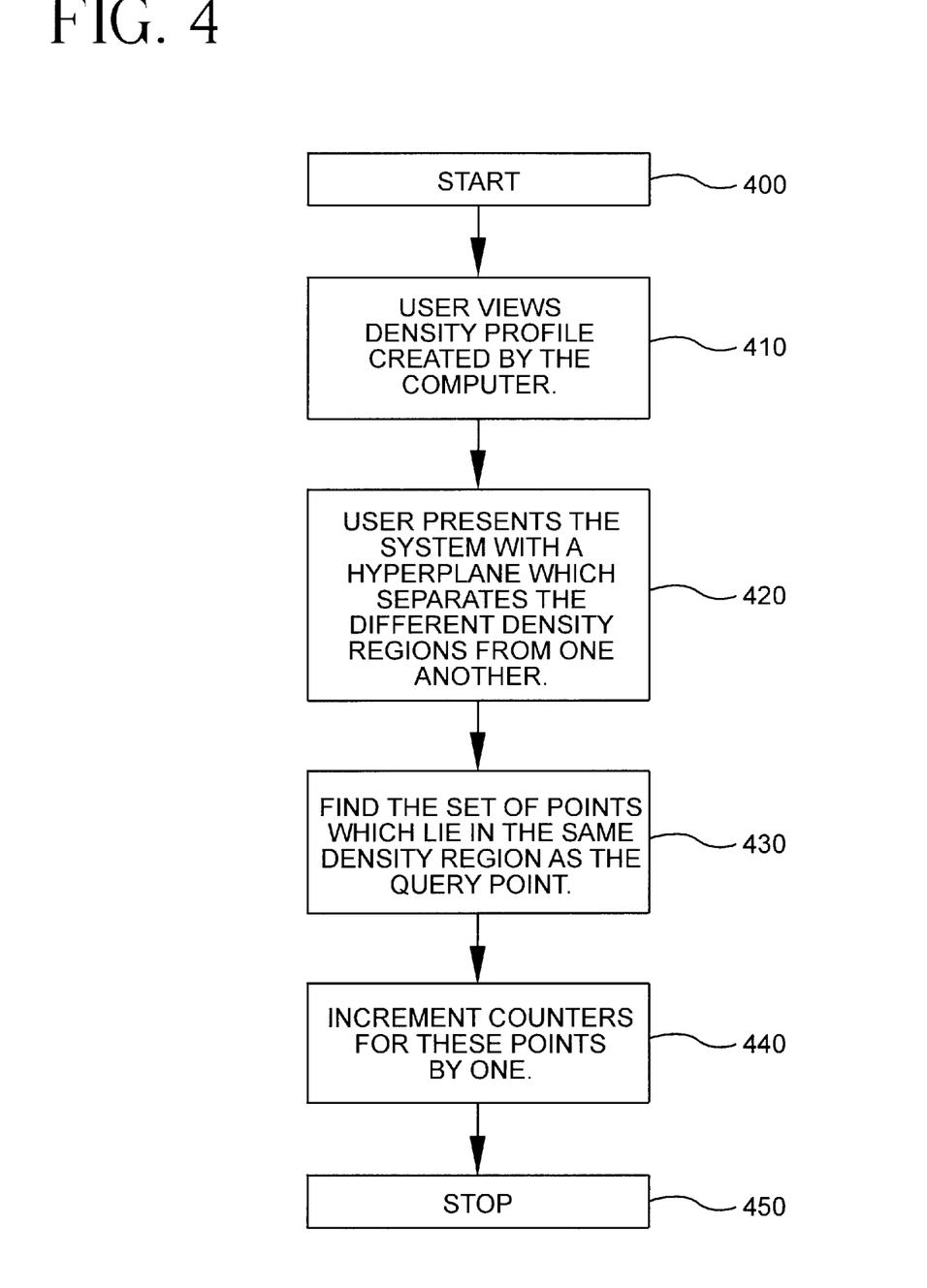
FIG. 4 is a flow diagram illustrating a process used to obtain and aggregate user feedback to determine meaningful sets of responses to queries according to an embodiment of the present invention.
Figure 8:
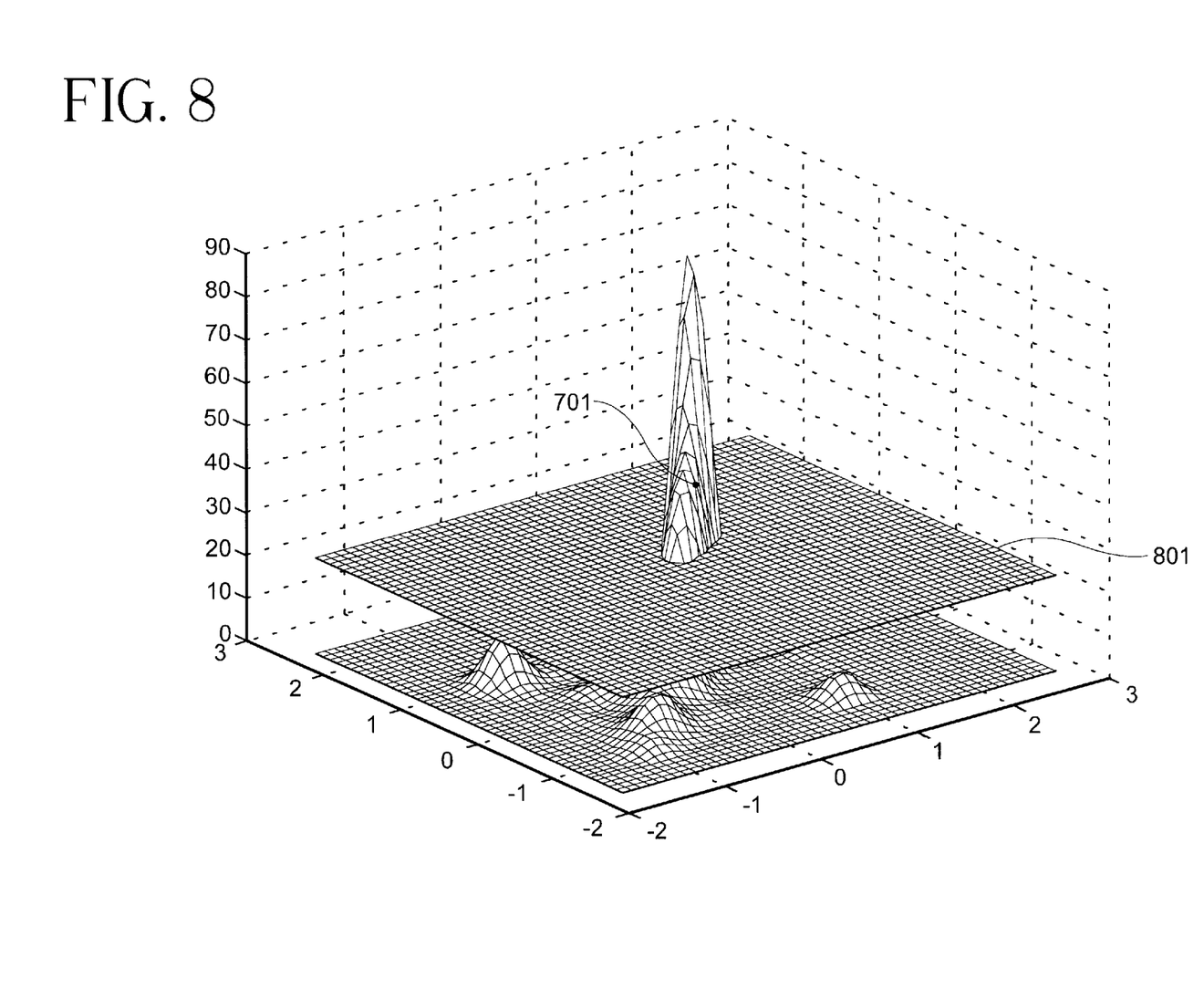
FIG. 8 is a diagram illustrating an example of a user specification of a hyperplane which separates different density regions according to an embodiment of the present invention.

Referring to FIG. 4, a flow diagram illustrates a process used to obtain and aggregate user feedback to determine meaningful sets of responses to queries according to an embodiment of the present invention. It is to be understood that this process corresponds to step 230 in FIG. 2. The feedback obtained from the user is valuable in determining the user's intentions in finding the most closely matching data point to the query. The process begins at block 400. In step 410, the density profile created from the method of FIG. 3 is viewed by the user. In step 420, the user then specifies a hyperplane which separates the different density regions in the profile from one another. An example of a hyperplane 801 which separates different density regions is illustrated in FIG. 8. Specification of the hyperplane represents the user's preference.

Next, in step 430, all the points which lie in the same density region as the query point 701 are found. In the example of FIG. 8, this includes all the points in the data whose density profile lies above the hyperplane 801. Note that in order to specify the hyperplane, the user preferably need only input the density value corresponding to the value of the density at which the hyperplane should be constructed (i.e., the value on the vertical axis). A detailed description of this step is provided below in the context of FIG. 5. The computer considers these points to be the points that the user is "voting" on as the points the user feels are the most likely matches to his query. The counters for these points are respectively incremented by one, in step 440. The process ends at block 450. Thus, the process of determining the user votes is an indirect one with the user specifying a simple density value which separates clusters of points in the density profile.

Figure 5:
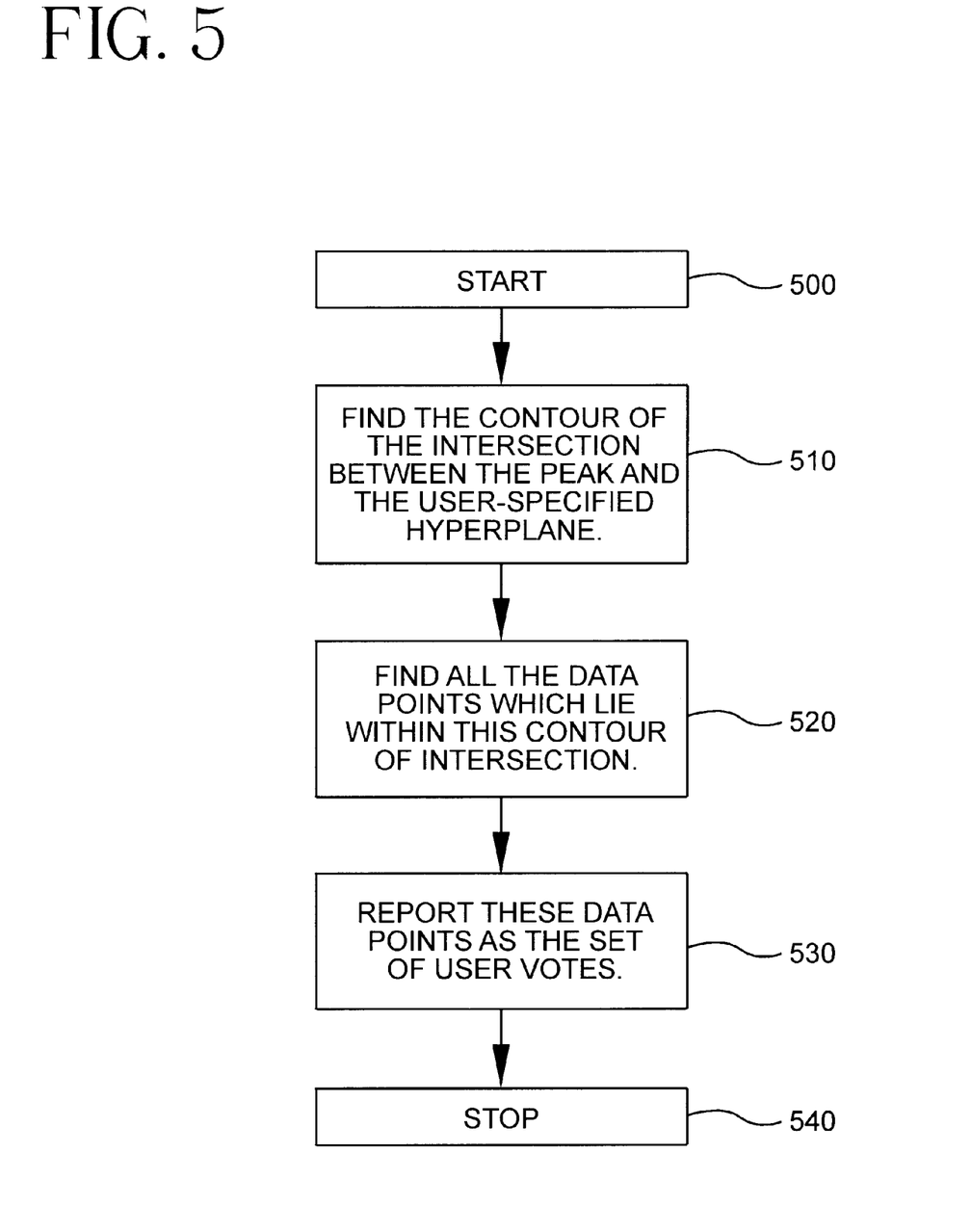
FIG. 5 is a flow diagram illustrating how user response in a single view can be used as an implicit determination of a set of votes of a user according to an embodiment of the present invention.

FIG. 5 is a flow diagram illustrating how user response in a single view (i.e., a single density profile shown to the user) can be used as an implicit determination of a set of votes of a user according to an embodiment of the present invention. It is to be understood that this process corresponds to step 430 in FIG. 4. More specifically, FIG. 5 illustrates how the hyperplane specified by the user may be used in order to determine the set of points which he has voted on. The process begins in block 500. In step 510, the contour of intersection between the peak containing the query point and the user-specified hyperplane is determined. For example, in FIG. 8, this contour corresponds to the contour of intersection between the peak visible above the hyperplane and the hyperplane itself. Once this contour has been determined, the set of data points which lie within this contour are determined in step 520. These are the points which are considered most relevant to the query and are reported, in step 530, as the set of user votes. The process ends at block 540.

It is to be appreciated that, as shown and discussed in the context of FIG. 2, an iterative loop exists between steps 220, 230 and 240. Thus, if the user determines that the process should not terminate, the method continues again with step 220, where the computer provides the user with another view of the data based on the hyperplane specified in the previous iteration of step 230. The user then may specify, another hyperplane so as to provide a set of votes on points in the second view. The interactive process of specifying a hyperplane and generation of an additional view based thereon may iterate as long as the user desires. Thus, the processes shown in FIGS. 3, 4 and 5 iterate as many times as the overall loop in FIG. 2 is iterated. As a result, votes over multiple hyperplanes must be aggregated in order to determine a final response. This aggregation process is shown in FIG. 6.

Figure 6:
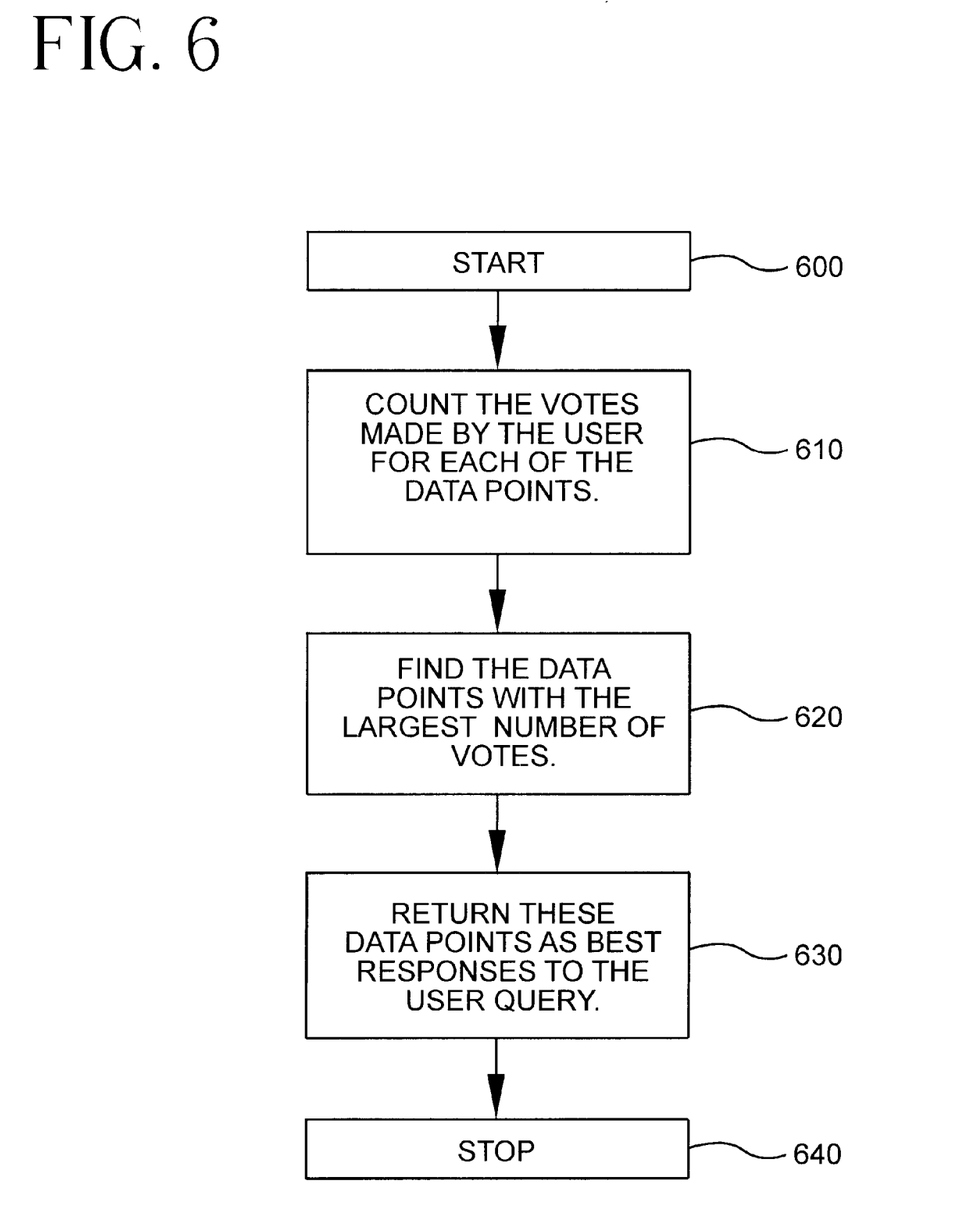
FIG. 6 is a flow diagram illustrating how user responses are used to create final responses to a given query according to an embodiment of the present invention.

FIG. 6 is a flow diagram illustrating how user responses are used to create final responses to a given query according to an embodiment of the present invention. It is to be understood that this process corresponds to step 250 in FIG. 2. More specifically, FIG. 6 illustrates a process of user vote compilation. The overall effect of this step is to aggregate the user responses in order to find the best match to the query point. It is to be understood that the phrase "user responses" here refers to the votes associated with the user picking points (by specifying hyperplanes) in multiple regions of the data during the iterative process involving steps 220, 230 and 240 of FIG. 2. The process begins at block 600. In step 610, the votes made by the user for each of the data points are counted. In step 620, the data points which have the largest number of votes are determined. These data points are returned as the best responses to the user query, in step 630. The process ends at block 640.

Advantageously, in accordance with the present invention, techniques are presented for providing the user with different kinds of views of a large database and using these views in order to make the best decisions about the matching points to a query. The overall responses of the user are aggregated in order to find the best set of matches. These responses are used in order to find the best match for a given query. The invention provides responses to user queries which are significantly more effective than simple matches based on pre-defined distance functions.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of querying a database, the method comprising the steps of:

generating at least one visual representation of data associated with the database in response to a query entered by a user, the visual representation being density-based and including an indication of a location of at least one query point within the density-based visual representation;

presenting the at least one visual representation to the user; and determining a result of the query based on at least one response received from the user, the at least one response being provided by the user in accordance with the user viewing the at least one visual representation including the location of the at least one query point and specifying at least one density value corresponding to a preference of the user.

2. The method of claim 1, wherein the steps of generating the visual representation, presenting the visual representation and receiving user response are iterated a number of times, based on a user's criterion, to determine a result of the query.

3. The method of claim 1, wherein the query entered by the user specifies the at least one query point.

4. The method of claim 1, wherein the at least one visual representation comprises a density profile.

5. The method of claim 4, wherein the density profile is generated using kernel density estimation.

6. The method of claim 4, wherein the at least one user response comprises the user specifying a hyperplane in accordance with the at least one visual representation.

7. The method of claim 6, wherein the hyperplane specifies a region of the density profile which the user determines to most likely contain a match to the query.

8. The method of claim 1, wherein the at least one visual representation is generated randomly.

9. The method of claim 1, wherein the at least one visual representation is generated based on a distribution of the data in the locality of a query point associated with the user-entered query.

10. The method of claim 1, wherein the at least one visual representation is a density profile and the at least one user response comprises the user specifying a density value to determine a set of data points in the database which are most relevant to the user-entered query.

11. The method of claim 10, wherein the user specification of a density value represents user votes for data points identified by the specification, and further wherein user votes over two or more density value specifications are counted to determine the query result.

12. The method of claim 11, wherein the counts of the votes are used to determine the most suitable nearest neighbors to a query point associated with the user-entered query.

13. The method of claim 1, wherein the query result comprises one or more patterns in the data associated with the database.

14. The method of claim 1, wherein the query result comprises one or more clusters in the data associated with the database.

15. The method of claim 14, wherein the one or more clusters in the data are determined by finding the patterns most closely related to different target objects which are randomly sampled from the database.

16. An apparatus for querying a database, the apparatus comprising:

at least one processor operative to: (i) generate at least one visual representation of data associated with the database in response to a query entered by a user, the visual representation being density-based and including an indication of a location of at least one query point within the density-based visual representation; (ii) cause the presentation of the at least one visual representation to the user; and (iii) determine a result of the query based on at least one response received from the user, the at least one response being provided by the user in accordance with the user viewing the at least one visual representation including the location of the at least one query point and specifying at least one density value corresponding to a preference of the user.

17. The apparatus of claim 16, wherein the operations of generating the visual representation, presenting the visual representation and receiving user response are iterated a number of times, based on a user's criterion, to determine a result of the query.

18. The apparatus of claim 16, wherein the query entered by the user specifies the at least one query point.

19. The apparatus of claim 16, wherein the at least one visual representation comprises a density profile.

20. The apparatus of claim 19, wherein the density profile is generated using kernel density estimation.

21. The apparatus of claim 19, wherein the at least one user response comprises the user specifying a hyperplane in accordance with the at least one visual representation.

22. The apparatus of claim 21, wherein the hyperplane specifies a region of the density profile which the user determines to most likely contain a match to the query.

23. The apparatus of claim 16, wherein the at least one visual representation is generated randomly.

24. The apparatus of claim 16, wherein the at least one visual representation is generated based on a distribution of the data in the locality of a query point associated with the user-entered query.

25. The apparatus of claim 16, wherein the at least one visual representation is a density profile and the at least one user response comprises the user specifying a density value to determine a set of data points in the database which are most relevant to the user-entered query.

26. The apparatus of claim 25, wherein the user specification of a density value represents user votes for data points identified by the specification, and further wherein user votes over two or more density value specifications are counted to determine the query result.

27. The apparatus of claim 26, wherein the counts of the votes are used to determine the most suitable nearest neighbors to a query point associated with the user-entered query.

28. The apparatus of claim 16, wherein the query result comprises one or more patterns in the data associated with the database.

29. The apparatus of claim 16, wherein the query result comprises one or more clusters in the data associated with the database.

30. The apparatus of claim 29, wherein the one or more clusters in the data are determined by finding the patterns most closely related to different target objects which are randomly sampled from the database.

31. An article of manufacture for querying a database, the article comprising a machine readable medium containing one or more programs which when executed implement the steps of:

generating at least one visual representation of data associated with the database in response to a query entered by a user, the visual representation being density-based and including an indication of a location of at least one query point within the density-based visual representation;

presenting the at least one visual representation to the user; and determining a result of the query based on at least one response received from the user, the at least one response being provided by the user in accordance with the user viewing the at least one visual representation including the location of the at least one query point and specifying at least one density value corresponding to a preference of the user.

32. The article of claim 31, wherein the steps of generating the visual representation, presenting the visual representation and receiving user response are iterated a number of times, based on a user's criterion, to determine a result of the query.

33. The article of claim 31, wherein the query entered by the user specifies at least one query point.

34. The article of claim 31, wherein the at least one visual representation comprises a density profile.

35. The article of claim 34, wherein the density profile is generated using kernel density estimation.

36. The article of claim 34, wherein the at least one user response comprises the user specifying a hyperplane in accordance with the at least one visual representation.

37. The article of claim 36, wherein the hyperplane specifies a region of the density profile which the user determines to most likely contain a match to the query.

38. The article of claim 31, wherein the at least one visual representation is generated randomly.

39. The article of claim 31, wherein the at least one visual representation is generated based on a distribution of the data in the locality of a query point associated with the user-entered query.

40. The article of claim 31, wherein the at least one visual representation is a density profile and the at least one user response comprises the user specifying a density value to determine a set of data points in the database which are most relevant to the user-entered query.

41. The article of claim 40, wherein the user specification of a density value represents user votes for data points identified by the specification, and further wherein user votes over two or more density value specifications are counted to determine the query result.

42. The article of claim 41, wherein the counts of the votes are used to determine the most suitable nearest neighbors to a query point associated with the user-entered query.

43. The article of claim 31, wherein the query result comprises one or more patterns in the data associated with the database.

44. The article of claim 31, wherein the query result comprises one or more clusters in the data associated with the database.

45. The article of claim 44, wherein the one or more clusters in the data are determined by finding the patterns most closely related to different target objects which are randomly sampled from the database.

46. An interactive feedback-based method of querying a database involving a user and a computer system, the method comprising the steps of:

the user entering a query;

the computer system generating at least one visual representation of data associated with the database in response to the query entered by a user, the visual representation being density-based and including an indication of a location of at least one query point within the density-based visual representation;

the computer system presenting the at least one visual representation to the user;

the user viewing the at least one visual representation;

the user providing at least one response to the computer system after viewing the at least one visual representation, the response including a specification of at least one density value corresponding to a preference of the user; and the computer system determining a result of the query based on the at least one response provided by the user.

* * * * *